United States Patent
Shen et al.

(10) Patent No.: US 10,607,503 B2
(45) Date of Patent: Mar. 31, 2020

(54) BLUSH GUIDE DEVICE AND METHOD THEREOF

(71) Applicant: CAL-COMP BIG DATA, INC., New Taipei (TW)

(72) Inventors: Shyh-Yong Shen, New Taipei (TW); Min-Chang Chi, New Taipei (TW); Cheng-Hsuan Tsai, New Taipei (TW)

(73) Assignee: CAL-COMP BIG DATA, INC., New Taipei (TW)

( * ) Notice: Subject to any disclaimer, the term of this patent is extended or adjusted under 35 U.S.C. 154(b) by 205 days.

(21) Appl. No.: 15/627,462

(22) Filed: Jun. 20, 2017

(65) Prior Publication Data
US 2018/0308384 A1 Oct. 25, 2018

(30) Foreign Application Priority Data
Apr. 24, 2017 (CN) .......................... 2017 1 0270472

(51) Int. Cl.
| | | |
|---|---|---|
| G09B 19/00 | (2006.01) | |
| G06K 9/00 | (2006.01) | |
| G09B 5/02 | (2006.01) | |
| A45D 44/00 | (2006.01) | |
| G06T 11/00 | (2006.01) | |

(52) U.S. Cl.
CPC ........... G09B 19/00 (2013.01); A45D 44/005 (2013.01); G06K 9/00255 (2013.01); G06K 9/00281 (2013.01); G06T 11/00 (2013.01); G09B 5/02 (2013.01); A45D 2044/007 (2013.01)

(58) Field of Classification Search
CPC ..... G09B 19/0076; G09B 19/10; A45D 44/00
See application file for complete search history.

(56) References Cited

U.S. PATENT DOCUMENTS

| | | | | |
|---|---|---|---|---|
| 2012/0044335 A1* | 2/2012 | Goto | .................... | A45D 44/005 348/77 |
| 2015/0145882 A1* | 5/2015 | Nguyen | ................. | H04N 1/622 345/589 |
| 2015/0366328 A1* | 12/2015 | Tamura | .................. | A45D 44/00 434/100 |

FOREIGN PATENT DOCUMENTS

| | | |
|---|---|---|
| EP | 2178045 | 4/2010 |
| JP | 2014023127 | 2/2014 |

OTHER PUBLICATIONS

"Search Report of Europe Counterpart Application", dated Feb. 22, 2018, p. 1-p. 6, in which the listed references were cited.

* cited by examiner

*Primary Examiner* — Omkar A Deodhar
(74) *Attorney, Agent, or Firm* — JCIPRNET

(57) ABSTRACT

A blush guide device is provided to guide a user to draw a blush. The blush guide device includes an image capturing unit, a processing unit and a display unit. The image capturing unit captures a user face image. The processing unit receives the user face image, and obtains a plurality of face feature points according to the user face image. The processing unit performs calculation according to the face feature points to obtain at least one blush guide block. The display unit displays the user face image and the corresponding blush guide block, and guides the user to put on makeup to the blush guide block. The disclosure further provides a blush guide method adapted to the blush guide device.

10 Claims, 5 Drawing Sheets

BLUSH GUIDE DEVICE AND METHOD THEREOF

CROSS-REFERENCE TO RELATED APPLICATION

This application claims the priority benefit of Chinese application serial no. 201710270472.2, filed on Apr. 24, 2017. The entirety of the above-mentioned patent application is hereby incorporated by reference herein and made a part of this specification.

BACKGROUND OF THE INVENTION

Field of the Invention

The invention relates to a facial feature recognition technique, and particularly relates to a blush guide device based on facial recognition and a method thereof.

Description of Related Art

The love of beauty is woman's nature, and many women will add facial features through makeup. However, the skill of makeup is not innate, and a makeup effect can be improved after a number of cosmetic practises.

If someone wants to learn a makeup skill, the learner may learn it from images on the Internet. However, the makeup skill learned through images may have a deviation in practice. Therefore, how to learn the makeup skill through modern equipment is a technical issue concerned by manufacturers.

SUMMARY OF THE INVENTION

The disclosure is directed to a blush guide device and a blush guide method, where a blush guide block is calculated and displayed according to a user face image, such that a user is able to put on makeup according to a prompt provided by the blush guide device, so as to provide convenient interactive makeup teaching.

An embodiment of the invention provides a blush guide device including an image capturing unit, a processing unit and a display unit. The image capturing unit captures a user face image, the processing unit receives the user face image, and obtains a plurality of face feature points according to the user face image. Moreover, the processing unit performs calculation according to the face feature points to obtain at least one blush guide block. The display unit displays the user face image and the corresponding blush guide block, and guides a user to put on makeup to the blush guide block.

An embodiment of the invention provides a blush guide method, which includes following steps. A user face image is captured, and a plurality of face feature points is obtained according to the user face image. Calculation is performed according to the face feature points to obtain at least one blush guide block, and the user face image and the corresponding blush guide block are displayed, and a user is guided to put on makeup to the blush guide block.

According to the above description, the blush guide device and the blush guide method of the disclosure may calculate and display the blush guide block according to the user face image. Therefore, the user learns a face area to be put on blush, and the user clearly knows a position of the blush in a makeup process. Moreover, the blush guide device may further provide a blush guide line to prompt the user a method of putting on the blush. In this way, even the user is not familiar with makeup, the user may still put on the makeup according to the prompt provided by the blush guide device, so as to provide convenient interactive makeup teaching.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
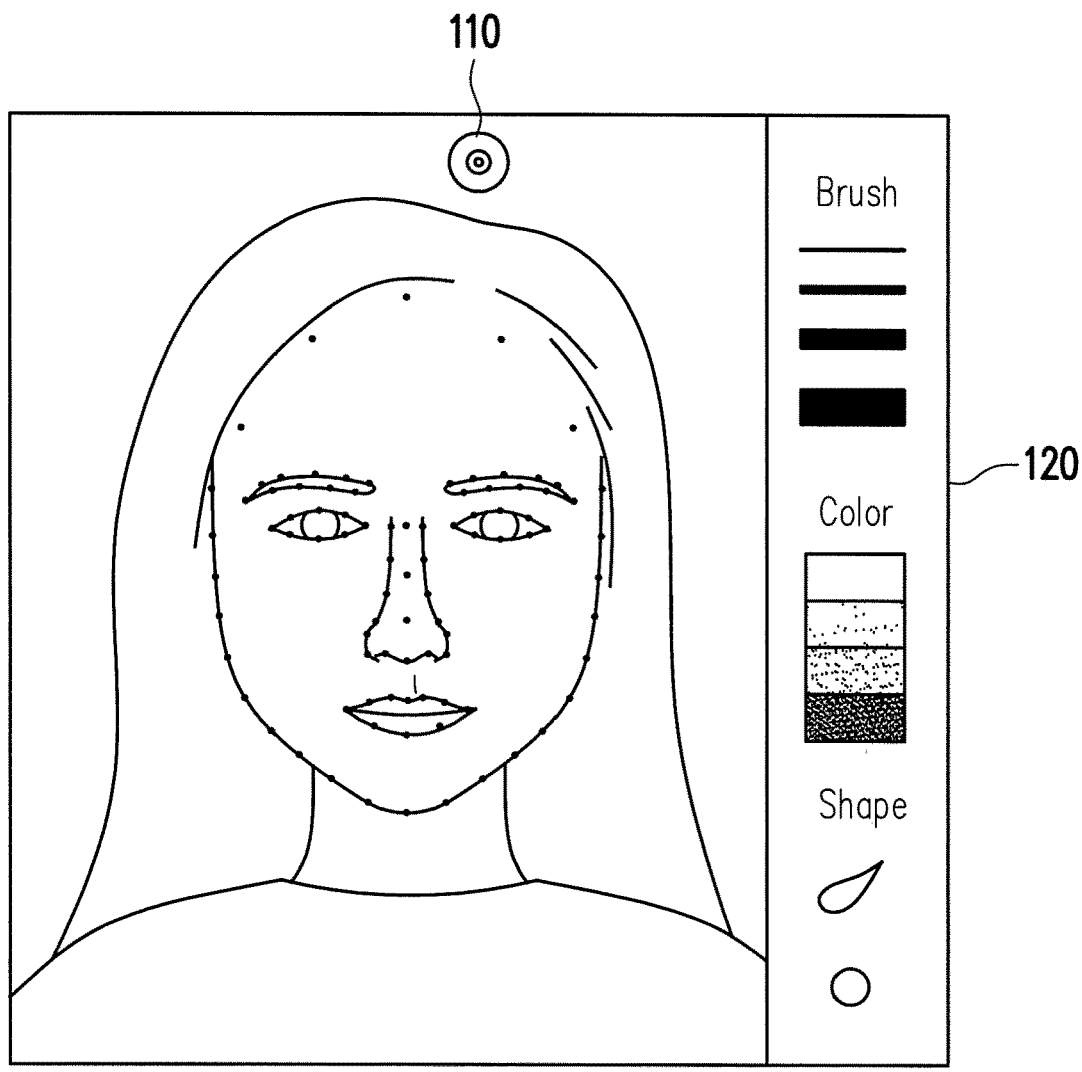
FIG. 1 is a schematic diagram of a display interface of a blush guide device according to an embodiment of the disclosure.
Figure 2:
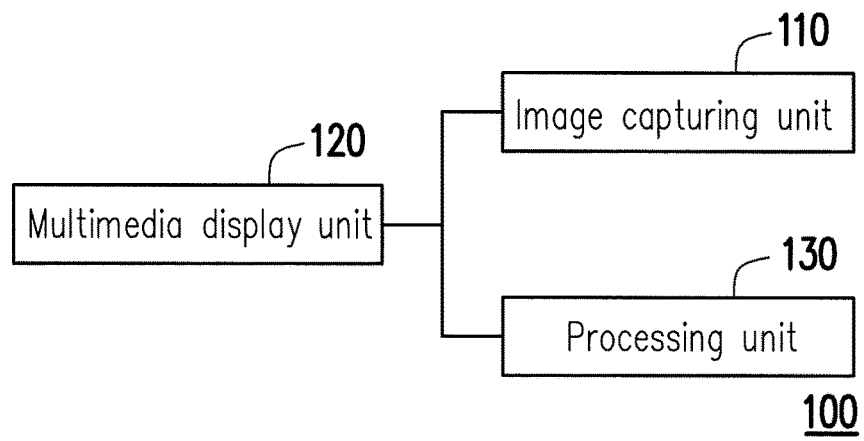
FIG. 2 is a system block diagram of a blush guide device according to an embodiment of the disclosure.

FIG. 1 is a schematic diagram of a display interface of a blush guide device according to an embodiment of the disclosure, and FIG. 2 is a system block diagram of a blush guide device according to an embodiment of the disclosure. Referring to FIG. 1 and FIG. 2, in the present embodiment, the blush guide device 100 includes an image capturing unit 110, a multimedia display unit 120 and a processing unit 130.

The image capturing unit 110 is used for capturing an image of a user, particularly a user face image. The image capturing unit 110 is, for example, an embedded camera an external mobile phone or an external camera connected to the display unit 120 and the processing unit 130 in a wired or wireless manner, which is not limited by the disclosure.

The display unit 120 may display multimedia information and the user face image in real-time. For example, the display unit 120 displays the user face image and options of types and colors of blushes for selecting by users. In the present exemplary embodiment, the display unit 120 can be disposed behind a material with a high reflectivity (for example, a mirror) and made of an organic light-emitting diode (OLED). In this way, the user may view his own face through the mirror, and the display unit 120 may display related information on the mirror for the user to view and for touch selection, though the disclosure is not limited thereto. The blush guide device 100 of the present embodiment can be a device disposed on a makeup table, and the display unit 120 of the blush guide device 100 can be disposed behind the mirror, and a text or an image displayed by the display unit 120 may pass through the mirror for the user to view. In other embodiments, the blush guide device 100 can also be a consumable electronic product such as a smart phone, a tablet PC, etc., or a portable mirror box combined with a portable mirror.

The processing unit 130 performs a calculation according to the user face image captured by the image capturing unit 110, so as to obtain a plurality of face feature points of the user related to a face profile of the user. In an implementation of the present exemplary embodiment, the processing unit 110 can be a central processing unit (CPU), a microprocessor, an application specific integrated circuits (ASIC), a programmable logic device (PLD) or other similar devices. The processing unit 130 is configured to run various necessary software programs and/or instruction sets for providing a blush guide block. In the present exemplary embodiment, the processing unit 130 runs a system using Dlib face landmark to detect and analyze 194 face feature points of the user's face. In other cases, the face feature points of the user can be obtained by only analyzing 119 face feature points of the user's face or use other algorithms for detecting the face feature points.

In the present embodiment, when the user faces the mirror to put on makeup, the display unit 120 may display the user face image, and analyze the face feature points in real-time. In order to provide the convenient interactive blush guide device, in the disclosure, the display unit 120 further displays the blush guide block to prompt a position and a manner of putting on the blush to the user. In this way, the user may draw the blush at the corresponding position on the user's face according to guidance of the blush guide block displayed by the display unit 120.

Figure 3:
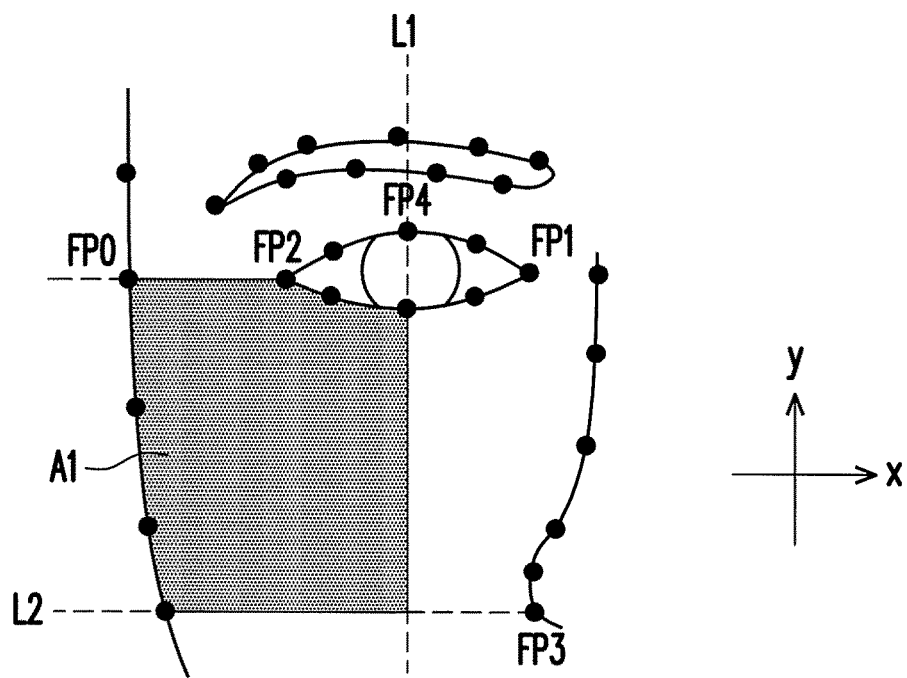
FIG. 3 is a schematic diagram of a blush guide block according to an embodiment of the disclosure.

To be specific, referring to FIG. 3, FIG. 3 is a schematic diagram of a blush guide block according to an embodiment of the disclosure. After the image capturing unit 110 captures the user face image, the processing unit 130 obtains a plurality of the face feature points of the user according to the user face image. Taking a left side of the user's face for example, the face feature points of the user obtained by the processing unit 130 at least include a face point FP0, an eye front point FP1 (i.e. the tear duct of eye), an eye tail point FP2, a nosewing point FP3. Moreover, it should be noted that the face point FP0 of the present exemplary embodiment is located at a periphery of the face of the user, and is parallel to the eye tail point FP2. For example, in the present embodiment, after the processing unit 130 obtains the face feature points of the user, the processing unit 130 assigns face feature point coordinates (x,y), and values of y-coordinates of the face point FP0 and the eye tail point FP2 are the same.

The face feature points of the user obtained by the processing unit 130 are not limited thereto. In other embodiments, the number of the face feature points obtained by the processing unit 130 can be 119, 194, etc. Moreover, for example, in the implementation of 194 face feature points, the system may number each of the face feature points, for example, number all of the face feature points by 0-139, where the face point FP0 is number 0, the eye front point FP1 is number 39, the eye tail point FP2 is number 36, and the nosewing point FP3 is number 88. A midpoint of the eye is located in the middle of the eye front point FP1 (the number 39) and the eye tail point FP2 (the number 36). However, the disclosure is not limited thereto.

After the face feature points are obtained, the processing unit 130 may further set a blush guide block A1 suitable for the user according to positions of the face feature points. For example, in an embodiment of the disclosure, the processing unit 130 calculates an eye midpoint FP4 of the eye front point FP1 and the eye tail point FP2 according to coordinates of the eye front point FP1 and the eye tail point FP2, and calculates a first vertical line L1 passing through the eye midpoint FP4 (i.e. an x-coordinate value of the first vertical line L1 is equal to an x-coordinate value of the eye midpoint FP4) according to the eye midpoint FP4. Then, the processing unit 130 calculates a second horizontal line L2 passing through the nosewing point FP3 (i.e. a y-coordinate value of the second horizontal line L2 is equal to a y-coordinate value of the nosewing point FP3) according to the nosewing point FP3. The processing unit 130 sets the blush guide block A1 to be a block located among the first vertical line L1, the second horizontal line L2 and the face point FP0, and displays the blush guide block A1 on the display unit 120. Namely, in the embodiment of FIG. 3, the position of the blush guide block A1 is located to the left of the first vertical line L1 and above the second horizontal line L2, but does not exceed the position of the face point FP0. In this way, even the user who is not familiar with the makeup may also draw a blush on the face at a position corresponding to the blush guide block A1.

It should be noted that if a right face of the user is taken as an example, the processing unit 130 may calculate the first vertical line and the second horizontal line according to a eye front point, an eye tail point of the right eye and a nosewing point of the right face, so as to calculate the position of the blush guide block. Therefore, the position of the blush guide block is located to the right of the first vertical line and above the horizontal line, but does not exceed the position of the face point.

Figure 4:
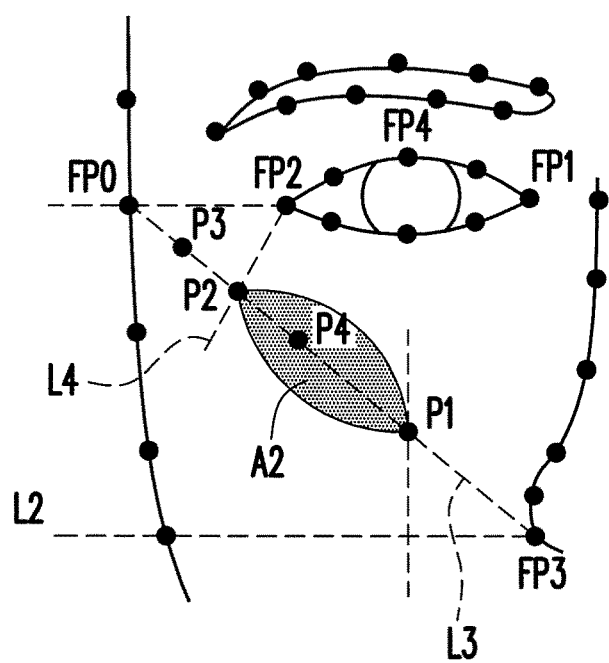
FIG. 4 is a schematic diagram of a blush guide block according to another embodiment of the disclosure.

FIG. 4 is a schematic diagram of a blush guide block according to another embodiment of the disclosure. Referring to FIG. 4, similar to FIG. 3, the processing unit 130 may calculate the first vertical line L1 and the second horizontal line L2 according to the eye front point FP1, the eye tail point FP2 and the nosewing point FP3. The difference is that the processing unit 130 may further calculate a third straight line L3 passing through the face point FP0 and the nosewing point FP3, and a fourth straight line L4 passing through the eye tail point FP2 and perpendicular to the third straight line L3. Then, the processing unit 130 calculates an intersection of the third straight line L3 and the first vertical line L1, and sets the same as a first intersection P1. Moreover, the processing unit 130 also calculates an intersection of the fourth straight line L4 and the third straight line L3, and sets the same as a second intersection P2. After the second intersection P2 is obtained, the processing unit 130 may calculate a midpoint between the second intersection P2 and the face point FP0 to obtain a third intersection P3. The processing unit 130 obtains an ellipse region according to the first intersection P1, the third intersection P3 and a fourth intersection P4, where the processing unit 130 takes the first intersection P1 and the third intersection P3 as two ends of a long axis of the ellipse region, takes the midpoint P4 of the first intersection P1 and the third intersection P3 as a center of the ellipse region, and takes a length of the fourth straight line L4 as a short axis of the ellipse region. In this way, the processing unit 130 sets the ellipse region formed by the first intersection P1, the third intersection P3 and the midpoint P4 as the blush guide block A2. Namely, the blush guide block A2 obtained in the embodiment of FIG. 4 satisfies an elliptical equation:

$$\frac{(x-h)^2}{a^2} + \frac{(y-k)^2}{b^2} = 1$$

Where (h, k) are (x, y) coordinates of the midpoint P4. "a" is half long axis of the ellipse, i.e. a half of the length between the first intersection P1 and the third intersection P3. "b" is a half short axis of the ellipse. In this way, even the user who is not familiar with the makeup may also draw a blush on the face at a position corresponding to the blush guide block A2.

Figure 5:
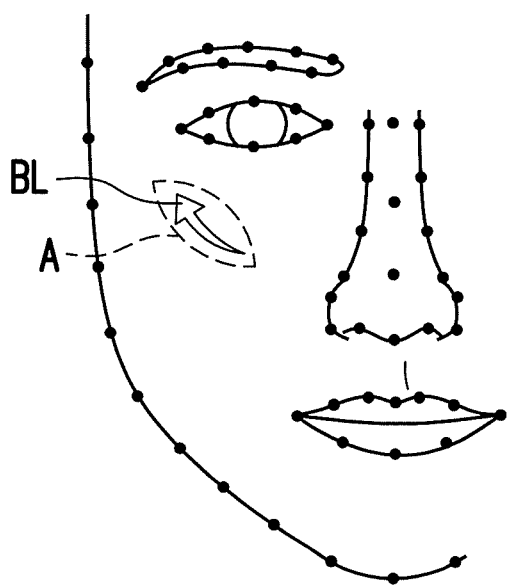
FIG. 5 is a schematic diagram of a blush guide line according to an embodiment of the disclosure.

In order to make the user's operation easier, in the disclosure, a blush guide line is further set in the blush guide block to prompt a skill of drawing the blush. The user may select a favourable blush drawing way in the display unit 110, or the processing unit 130 selects a blush drawing method suitable for a face shape of the user. FIG. 5 is a schematic diagram of a blush guide line according to an embodiment of the disclosure. As shown in FIG. 5, the processing unit 130 may display a blush guide line BL selected by the user in the blush guide block A. For example, in the present embodiment, the blush guide line BL in the blush guide block A is an up-lifting triangular drawing way, though the disclosure is not limited thereto.

Figure 6:
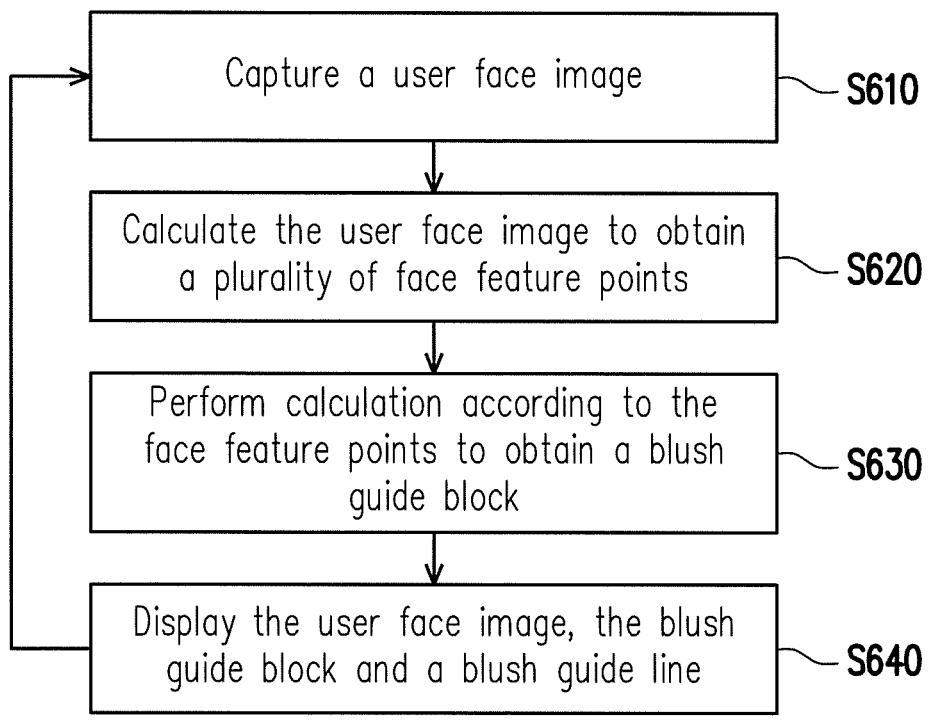
FIG. 6 is a flowchart illustrating a blush guide method according to an embodiment of the disclosure.

FIG. 6 is a flowchart illustrating a blush guide method according to an embodiment of the disclosure. Referring to FIG. 2 and FIG. 6, when the user wants to get a guidance for drawing the blush through the blush guide device 100, first, in step S610, the image capturing unit 110 captures a user face image, and transmits the captured user face image to the processing unit 130. Then, in step S620, the processing unit 130 calculates the captured user face image to obtain a plurality of face feature points. Moreover, in step S630, the processing unit 130 calculates the face feature points to obtain a blush guide block corresponding to the face of the user. Finally, in step S640, the processing unit 130 transmits the user face image captured by the image capturing unit 110 and the blush guide block calculated by the processing unit 130 to the display unit 120, and the display unit 120 displays the user face image, the blush guide block and the blush guide line.

It should be noted that in the present exemplary embodiment, since the blush guide method is to capture the user face image and calculate the blush guide block in a real-time manner, the step S610 to the step S640 are repeatedly executed until the user stops operation.

Moreover, the blush guide method of the present exemplary embodiment may adjust a pattern of the blush guide line according to an option selected by the user. Furthermore, the user may also click and select a color, a texture of the blush displayed in the display unit 120, and preview the same through the display unit 120. In other exemplary embodiments, the processing unit 130 may finely adjust the blush guide block according to the color, the texture selected by the user, or change a pattern of the blush guide line, and display the same in the display unit 120.

Figure 7:
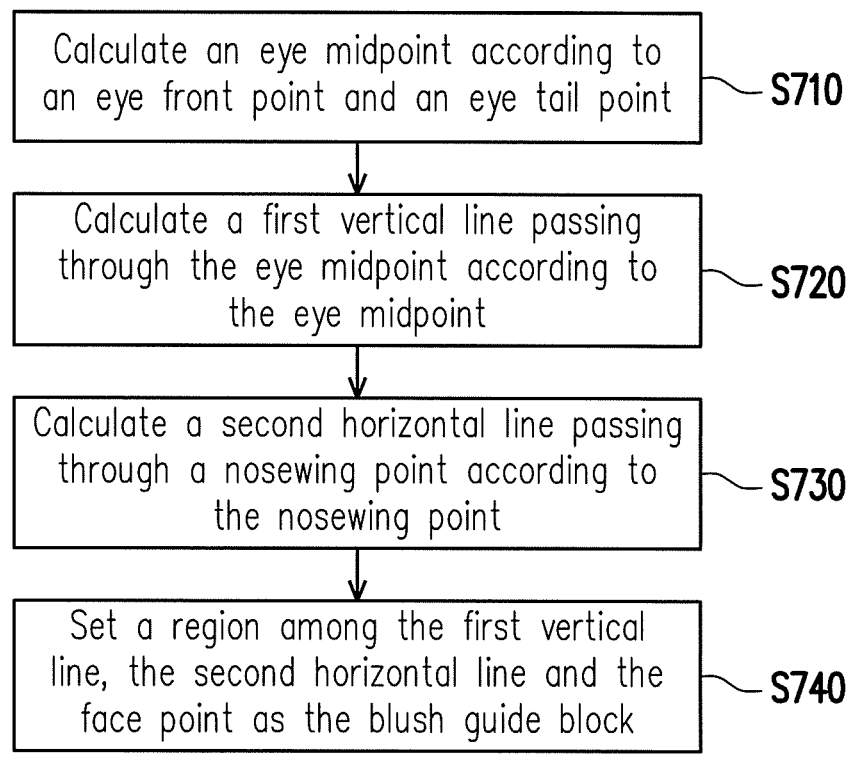
FIG. 7 is a detailed flowchart for obtaining a blush guide block according to an embodiment of the disclosure.
Figure 8:
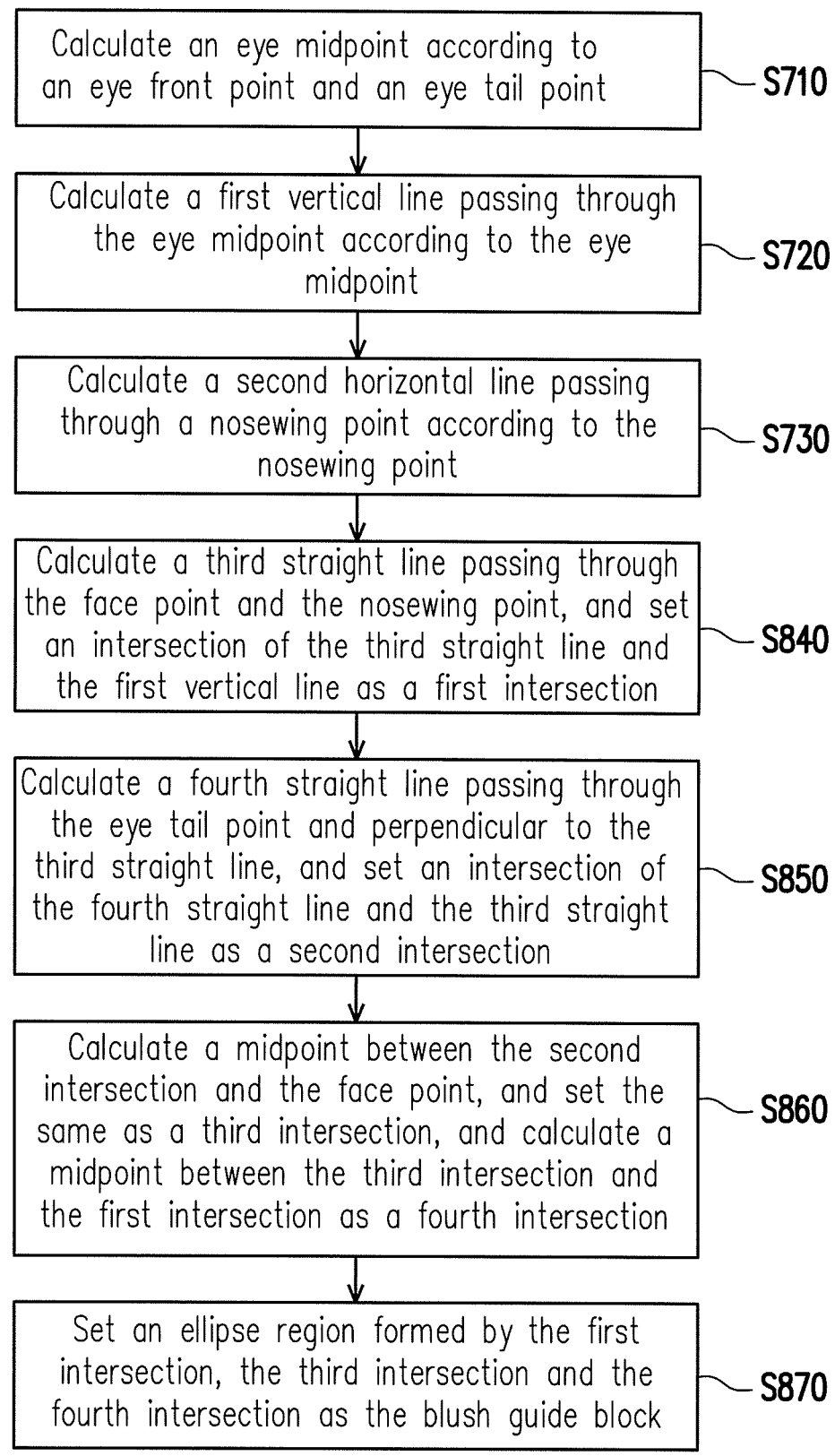
FIG. 8 is a detailed flowchart for obtaining a blush guide block according to another embodiment of the disclosure.

FIG. 7 and FIG. 8 are respectively detailed flowcharts for obtaining a blush guide block according to different embodiments of the disclosure. Referring to FIG. 3 and FIG. 7, in the present exemplary embodiment, in the step S630, when the processing unit 130 calculates the face feature points to obtain the blush guide block A1, a step S710 is first executed, by which the processing unit 130 calculates the eye midpoint FP4 according to the eye front point FP1 and the eye tail point FP2. Then, in step S712, the processing unit 130 further calculates the first vertical line L1 passing through the eye midpoint FP4 according to the eye midpoint FP4. In step S714, the processing unit 130 calculates the second horizontal line L2 passing through the nosewing point FP3 according to the nosewing point FP3. In step S716, the processing unit 130 calculates the blush guide block A1 according to the first vertical line L1 and the second horizontal line L2. The detailed calculation method has been described in the embodiment of FIG. 3, so that detail thereof is not repeated. Through the flow of FIG. 7, the processing unit 130 may calculate the blush guide block A1. Therefore, the user may view the calculated blush guide block A1 through the display unit 120, and draw the blush on the face at a position corresponding to the blush guide block A1.

In another exemplary embodiment, referring to FIG. 4 and FIG. 8, in the step S630, when the processing unit 130 calculates the face feature points to obtain the blush guide block A2, the steps S710 to S730 are the same to that of FIG. 7, and details thereof are not repeated. The difference is that in the present exemplary embodiment, not only the blush guide block A2 is obtained through the first vertical line L1 and the second horizontal line L2, in step S840, the processing unit 130 further calculates a third straight line L3 passing through the face point FP0 and the nosewing point FP3, and sets an intersection of the third straight line L3 and the first vertical line L1 as a first intersection P1. In step S850, the processing unit 130 calculates a fourth straight line L4 passing through the eye tail point FP2 and perpendicular to the third straight line L3, and sets an intersection of the fourth straight line L4 and the third straight line L3 as a second intersection P2. Then, in step S860, the processing unit 130 calculates a midpoint between the second intersection P2 and the face point FP0, and sets the same as a third intersection P3. The processing unit 130 sets a midpoint between the third intersection P3 and the first intersection P1 as a fourth intersection P4. Finally, in step S870, the processing unit 130 calculates the blush guide block A2 according to the first intersection P1, the third intersection P3 and the fourth intersection P4. Detailed calculation method thereof has been described in the embodiment of FIG. 4, and detail thereof is not repeated. Through the flow of FIG. 8, the processing unit 130 may calculate the blush guide block A2. Therefore, the user may view the calculated blush guide block A2 through the display unit 120, and draw the blush on the face at a position corresponding to the blush guide block A2.

In summary, the blush guide device and the blush guide method of the disclosure may calculate and display the blush guide block according to the user face image, such that the user may learn a face area to be put on blush, and the user clearly knows a position of the blush in a makeup process. Moreover, the blush guide device may further provide a blush guide line to prompt the user a style and a method of putting on the blush. In this way, even the user is not familiar with the makeup, the user may still put on the makeup according to the prompt provided by the blush guide device, so as to provide convenient interactive makeup teaching.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:
1. A blush guide device, comprising:
   a camera, capturing a user face image;
   a processor, receiving the user face image, obtaining a plurality of face feature points according to the user face image, and performing calculation according to the face feature points to obtain at least one blush guide block; and a display, displaying the user face image and the corresponding blush guide block, wherein in response to selection of a blush drawing way, the processor obtains a blush guide line corresponding to a drawing direction and a drawing pattern according to the blush drawing way, and the display displays the blush guide line in the blush guide block, so as to guide a user to put on makeup to the blush guide block according to the blush guide line.

2. The blush guide device as claimed in claim 1, wherein the face feature points at least comprise a nosewing point, an eye front point, an eye tail point, a face point, and the face point is located at a periphery of the user face, wherein the y-coordinates of the face point are the same as the y-coordinates of the eye tail point, and the nosewing point is located at side bottom of a nose contour of the user face, the processor calculates an eye midpoint according to the eye front point and the eye tail point, calculates a first vertical line passing through the eye midpoint according to the eye midpoint, and calculates a second horizontal line passing through the nosewing point according to the nosewing point, the processor sets a region among the first vertical line, the second horizontal line and the face point as the blush guide block.

3. The blush guide device as claimed in claim 2, wherein the processor obtains a third straight line passing through the face point and the nosewing point, wherein an intersection of the third straight line and the first vertical line is set as a first intersection, the processor calculates a fourth straight line perpendicular to the third straight line and passing through the eye tail point, wherein an intersection of the fourth straight line and the third straight line is set as a second intersection, the processor calculates a midpoint between the second intersection and the face point to obtain a third intersection, and the calculates a midpoint between the first intersection and the third intersection to obtain a fourth intersection, the processor obtains an ellipse region according to the first intersection, the third intersection and the fourth intersection, and sets the ellipse region as the blush guide block, wherein a connection line between the first intersection and the third intersection is a long axis of the ellipse region, and the fourth intersection is a center of the ellipse region.

4. The blush guide device as claimed in claim 1, wherein the display displays a blush guide line in the blush guide block.

5. The blush guide device as claimed in claim 1, wherein the camera captures the user face image in real-time, and calculates the face feature points in real-time, so as to obtain the blush guide block and display the user face image.

6. A blush guide method, comprising:
capturing a user face image;
obtaining a plurality of face feature points according to the user face image;
performing calculation according to the face feature points to obtain at least one blush guide block; and
displaying the user face image and the corresponding blush guide block, wherein in response to selection of a blush drawing way, obtaining a blush guide line corresponding to a drawing direction and a drawing pattern according to the blush drawing way by a processor, and displaying the blush guide line in the blush guide block by a display, so as to guide a user to put on makeup to the blush guide block according to the blush guide line.

7. The blush guide method as claimed in claim 6, wherein the face feature points at least comprise a nosewing point, an eye front point, an eye tail point, a face point, and the face point is located at a periphery other user face, wherein the y-coordinates of the face point are the same as the y-coordinates of the eye tail point, and the nosewing point is located at side bottom of a nose contour of the user face, wherein the step of calculating the face feature points to obtain the blush guide block comprises:
calculating an eye midpoint according to the eye front point and the eye tail point, and calculating a first vertical line passing through the eye midpoint according to the eye midpoint;
calculating a second horizontal line passing through the nosewing point according to the nosewing point; and
setting a region among the first vertical line, the second horizontal line and the face point as the blush guide block.

8. The blush guide method as claimed in claim 7, further comprising:
obtaining a third straight line passing through the face point and the nosewing point, wherein an intersection of the third straight line and the first vertical line is set as a first intersection;
calculating a fourth straight line perpendicular to the third straight line and passing through the eye tail point, wherein an intersection of the fourth straight line and the third straight line is set as a second intersection,
calculating a midpoint between the second intersection and the face point to obtain a third intersection;
calculating a midpoint between the first intersection and the third intersection to obtain a fourth intersection; and
obtaining an ellipse region according to the first intersection, the third intersection and the fourth intersection, and setting the ellipse region as the blush guide block, wherein a connection line between the first intersection and the third intersection is a long axis of the ellipse region, and the fourth intersection is a center of the ellipse region.

9. The blush guide method as claimed in claim 7, further comprising:
displaying a blush guide line in the blush guide block.

10. The blush guide method as claimed in claim 7, wherein the user face image is captured in real-time, and the face feature points are calculated in real-time, so as to obtain the blush guide block and display the user face image.

* * * * *